US011538335B2

(12) United States Patent
Namba

(10) Patent No.: US 11,538,335 B2
(45) Date of Patent: Dec. 27, 2022

(54) TRAFFIC CONTROL SYSTEM FOR AUTOMATIC DRIVING VEHICLE

(71) Applicant: SUBARU CORPORATION, Tokyo (JP)

(72) Inventor: Ryosuke Namba, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 324 days.

(21) Appl. No.: 16/733,040

(22) Filed: Jan. 2, 2020

(65) Prior Publication Data
US 2020/0302787 A1 Sep. 24, 2020

(30) Foreign Application Priority Data
Mar. 19, 2019 (JP) .............................. JP2019-051704

(51) Int. Cl.
*G08G 1/0967* (2006.01)
*G05D 1/02* (2020.01)
*G08G 1/01* (2006.01)

(52) U.S. Cl.
CPC ..... *G08G 1/096725* (2013.01); *G05D 1/0285* (2013.01); *G08G 1/0112* (2013.01);
(Continued)

(58) Field of Classification Search
CPC .... G05D 1/0061; G05D 1/0088; G05D 1/021; G05D 1/0214; G05D 1/0221; G05D 1/0223; G05D 1/0285; G05D 2201/0212; G05D 2201/0213; G08G 1/0965; G08G 1/0967; G08G 1/0122; G08G 1/096725;
(Continued)

(56) References Cited

U.S. PATENT DOCUMENTS 9,201,421 B1 * 12/2015 Fairfield .............. G05D 1/0022
9,465,388 B1 * 10/2016 Fairfield .............. G05D 1/0044
(Continued)

FOREIGN PATENT DOCUMENTS

WO      2009/090729 A1      7/2009
WO  WO-2009090729 A1 *  7/2009  ............. G01C 21/26

*Primary Examiner* — Jeff A Burke
*Assistant Examiner* — Blake A Wood
(74) *Attorney, Agent, or Firm* — McDermott Will & Emery LLP

(57) ABSTRACT

A traffic control system for an automatic driving vehicle includes a vehicle control system and a management and control system. The management and control system collects snow removal information by a snow removal information collector, and calculates traveling environment information of the snow-removed area by a snow-removed area traveling environment information calculator. The vehicle control system performs, by a first automatic driving controller, first automatic driving control that is made redundant by a control system based on map information and location information and by a control system based on external environment recognition information. The vehicle control system performs, by a second automatic driving controller, second automatic driving control that is made redundant by a control system based on the location information and the map information corrected using the traveling environment information of the snow-removed area and by a control system based on the external environment recognition information.

4 Claims, 5 Drawing Sheets

(52) U.S. Cl.
    CPC ............... *G05D 2201/0212* (2013.01); *G05D 2201/0213* (2013.01)

(58) Field of Classification Search
    CPC ....... G08G 1/096775; G08G 1/096791; G08G 1/09626; B60W 2556/00; B60W 30/12; B60W 30/16; B60W 30/162; B60W 30/165; B60W 30/17; B60W 30/182; B60W 50/082; B60K 28/00–165
    See application file for complete search history.

(56) References Cited

U.S. PATENT DOCUMENTS

| | | | |
|---|---|---|---|
| 9,766,336 B2 * | 9/2017 | Gupta | G01S 17/06 |
| 2018/0074492 A1 * | 3/2018 | Yamamoto | B60W 50/14 |
| 2019/0294167 A1 * | 9/2019 | Kutila | G01C 21/3461 |
| 2020/0005647 A1 * | 1/2020 | Tsurumi | G09B 29/10 |

* cited by examiner ns and location information of the own vehicle and by a control system for the automatic driving based on external environment recognition information obtained by autonomously recognizing an external environment of the own vehicle.
TRAFFIC CONTROL SYSTEM FOR AUTOMATIC DRIVING VEHICLE

CROSS-REFERENCE TO RELATED APPLICATIONS

The present application claims priority from Japanese Patent Application No. 2019-51704 filed on Mar. 19, 2019, the entire contents of which are hereby incorporated by reference.

BACKGROUND

The technology relates to a traffic control system for an automatic driving vehicle which delivers information to an automatic driving vehicle traveling in a snow-removed area of a snow-covered section.

In recent years, for a vehicle such as an automobile, an automatic driving technique, which enables traveling without requiring a driver's driving operation, has been developed towards practical use. In a case of traveling in a region covered with snow with such an automatic driving vehicle, it is necessary to travel in a snow-removed area as a provisional lane, and the selection of a route is thus important.

Therefore, for example, International Publication No. WO 2009/090729 discloses a technique in which information of a snow-removed road and information of the time elapsed from the time of snow removal are acquired, a priority of the snow-removed road is set, and a traveling route corresponding to the priority is searched for.

SUMMARY

An aspect of the technology provides a traffic control system for an automatic driving vehicle. The system includes a vehicle control system for an automatic driving vehicle that is capable of traveling by automatic traveling, and a management and control system configured to deliver traveling environment information of a snow-covered section of a road to the automatic driving vehicle. The management and control system includes: a snow removal information collector configured to collect snow removal information on a snow-removed area of the snow-covered section from at least one of a snow removal vehicle that performs snow removal work in the snow-covered section or the automatic driving vehicle that travels in the snow-removed area of the snow-covered section; and a snow-removed area traveling environment information calculator configured to calculate the traveling environment information of the snow-removed area in the snow-covered section based on the snow removal information collected by the snow removal information collector. The vehicle control system includes: a first automatic driving controller configured to perform first automatic driving control that is made redundant by a control system for the automatic driving based on map information held in an own vehicle and location information of the own vehicle and by a control system for the automatic driving based on external environment recognition information obtained by autonomously recognizing an external environment of the own vehicle; and a second automatic driving controller configured to perform second automatic driving control that is made redundant by a control system for the automatic driving based on the location information of the own vehicle and the map information corrected using the traveling environment information of the snow-removed area and by a control system for the automatic driving based on the external environment recognition information obtained by autonomously recognizing an external environment of the own vehicle.

An aspect of the technology provides a traffic control system for an automatic driving vehicle. The system includes first circuitry provided in a vehicle control system for an automatic driving vehicle that is capable of traveling by automatic traveling, and second circuitry provided in a management and control system configured to deliver traveling environment information of a snow-covered section of a road to the automatic driving vehicle. The second circuitry collects snow removal information on a snow-removed area of the snow-covered section from at least one of a snow removal vehicle that performs snow removal work in the snow-covered section or the automatic driving vehicle that travels in the snow-removed area of the snow-covered section, and calculates the traveling environment information of the snow-removed area in the snow-covered section based on the collected snow removal information. The first circuitry performs first automatic driving control that is made redundant by a control system for the automatic driving based on map information held in an own vehicle and location information of the own vehicle and by a control system for the automatic driving based on external environment recognition information obtained by autonomously recognizing an external environment of the own vehicle, and performs second automatic driving control that is made redundant by a control system for the automatic driving based on the location information of the own vehicle and the map information corrected using the traveling environment information of the snow-removed area and by a control system for the automatic driving based on the external environment recognition information obtained by autonomously recognizing an external environment of the own vehicle.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. In an automatic driving vehicle, in order to improve safety, a technique is generally employed to hold redundancy by providing: a control system that detects an external environment of an own vehicle, such as a road shape, with an in-vehicle sensor to recognize a traveling lane of the own vehicle; and a control system that makes matching between high-precision map information and location information of the own vehicle measured by a global navigation satellite system (GNSS) satellite or the like to recognize the traveling lane.

In a case of traveling in a snow-removed area of a snow-covered section with such an automatic driving vehicle, it is possible to perform automatic driving control by detecting a road surface, a snow wall, and the like with the in-vehicle sensor and calculating a travelable range. However, a provisional lane in the snow-removed area does not necessarily match the lane information stored in the map information in the vehicle, making it impossible to perform the control based on the positioning information and the map information.

Therefore, with the prior art, even when the traveling in the snow-removed area of the snow-covered section is attempted by the automatic driving, it is difficult to perform the automatic driving with redundancy, and only limited driving support and manual driving by a driver are possible.

Accordingly, it is desirable to provide a traffic control system for an automatic driving vehicle that is capable of causing, during traveling in a snow-removed area of a snow-covered section, an automatic driving vehicle to travel in the snow-removed area by automatic driving while the redundancy of the automatic driving is ensured.

Figure 1:
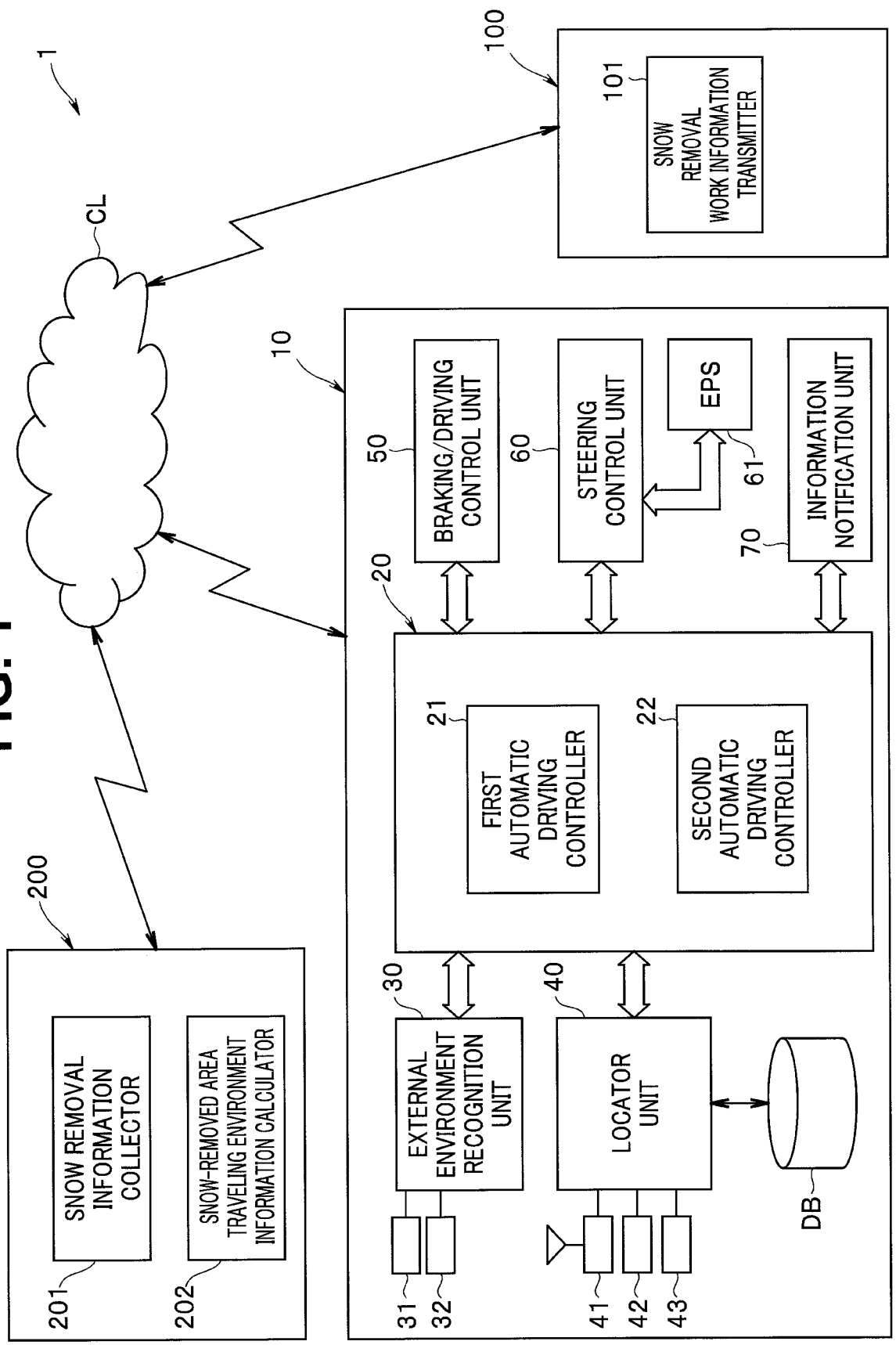
FIG. 1 is an overall configuration diagram illustrating a traffic control system for an automatic driving vehicle.

Hereinafter, an embodiment of the technology will be described with reference to the drawings. FIG. 1 is an overall configuration diagram illustrating a traffic control system for an automatic driving vehicle. As illustrated in FIG. 1, a traffic control system 1 for an automatic driving vehicle in the present embodiment is mounted in the automatic driving vehicle that is capable of traveling by automatic driving. The traffic control system 1 includes: a vehicle control system 10 for transmitting traveling information onto a network (hereinafter simply referred to as a "cloud") CL formed by cloud computing; and a management and control system 200 linked with the cloud, for collecting and processing traveling information of a plurality of vehicles.

Note that the vehicles that transmit information to the cloud CL are not limited to the automatic driving vehicles but also include a snow removal vehicle that performs snow removal work in a snow-covered section of a road. A controlling system 100 of the snow removal vehicle transmits snow removal work information to be described later from a snow removal work information transmitter 101 to the cloud CL.

In the present embodiment, the vehicle control system 10 includes, as a main component, an automatic driving control unit 20 that controls the traveling by the automatic driving without requiring a driving operation of the vehicle's occupant. The automatic driving control unit 20 is coupled with an external environment recognition unit 30, a locator unit 40, a braking/driving control unit 50, a steering control unit 60, an information notification unit 70, and the like in a mutually communicable manner via an in-vehicle network.

The external environment recognition unit 30 includes various devices for environmental recognition such as a camera unit 31 and a radar device 32 like a millimeter wave radar or a laser radar. The external environment recognition unit 30 recognizes an external environment around an own vehicle based on detection information of an object around the own vehicle detected by the camera unit 31, the radar device 32, and the like, traffic information acquired by infrastructure communication such as road-to-vehicle communication and vehicle-to-vehicle communication, location information of the own vehicle measured by the locator unit 40, and some other information.

For example, when a stereo camera made up of two cameras for capturing images of the same object from different viewpoints is mounted as the camera unit 31 in the own vehicle, the external environment recognition unit 30 performs stereo processing on a pair of right and left images captured by the stereo camera to three-dimensionally recognize the external environment. The camera unit 31 as the stereo camera is configured by, for example, disposing two shutter-synchronized color cameras, each camera having an imaging device such as a charge-coupled device (CCD) and a complementary metal-oxide-semiconductor (CMOS), on the right and left in a vehicle-width direction with a predetermined baseline length near a rear-view mirror located in an upper portion of a vehicle interior inside a windshield.

The pair of right and left images captured by the camera unit 31 as the stereo camera is subjected to matching processing to obtain a pixel shift amount (parallax) at corresponding positions between the right and left images. Then, the pixel shift amount is converted into luminance data or the like, and a distance image is generated. Points on the distance image are coordinate-transformed to points in a real space with the own vehicle centered therein according to the principle of triangulation, and right and left lane lines partitioning a traveling lane of a road where the own vehicle is traveling, obstacles, vehicles traveling ahead of the own vehicle, and the like are recognized three-dimensionally.

The right and left lane lines of the road can be recognized by extracting a group of point to be candidates for each of the lane lines from the image and calculating a straight line and a curve that connect the candidate points. For example, in a lane line detection region set on the image, an edge is detected where the luminance changes by a predetermined amount or more on a plurality of search lines set in a horizontal direction (vehicle width direction), and a pair of lane line start point and a lane line end point for each search line is detected. Thereby, an intermediate region between the lane line start point and the lane line end point is extracted as a lane-line candidate point.

Then, time-series data of a spatial coordinate position of the lane-line candidate point is processed based on an amount of movement of the vehicle per unit time to calculate a model approximating the right and left lane lines, whereby the lane lines are recognized. As the approximate model for the lane line, it is possible to use an approximate model obtained by connecting linear components determined by Hough transform, or a model approximated using a curve of a quadratic equation or the like.

The locator unit 40 detects the location of the own vehicle mainly by positioning based on signals from a plurality of navigation satellites such as global navigation satellite system (GNSS) satellites. Further, when the positioning accuracy deteriorates due to a captured state of the signals (radio waves) from the satellites, an influence of multipath caused by reflection of radio waves, or the like, the locator unit 40 concurrently uses positioning by autonomous navigation using in-vehicle sensors such as a gyro sensor 42 and a vehicle speed sensor 43 to detect the location of the own vehicle.

In the positioning by the plurality of navigation satellites, a signal containing information on a trajectory, a time, and the like, transmitted from the navigation satellite, is received via a receiver 41, and based on the received signal, a self-location of the own vehicle is measured as an absolute location including information of a longitude, a latitude, an altitude, and a time. In the positioning by the autonomous navigation, based on a distance of movement of the own vehicle, calculated from a forward-movement orientation of the own vehicle detected by the gyro sensor 42, a vehicle speed pulse output from the vehicle speed sensor 43, and the like, the location of the own vehicle is measured as an amount of a relative change in location.

Moreover, the locator unit 40 includes a map database DB and identifies the location on map data of the map database DB from the positioned location data of the own vehicle. The map database DB is a database for holding a high-precision map created for traveling control including automatic driving and is stored in a large-capacity storage medium such as a hard disk drive (HDD) or a solid-state drive (SSD).

For example, the high-precision map is configured as a multi-dimensional map (dynamic map) for holding, in a plurality of hierarchies, static information such as a road shape and the connection relationships among roads and dynamic information such as traffic information collected by infrastructure communication. The road data includes the types of the road lane lines, the number of traveling lanes, a width of each the traveling lanes, point row data indicating the center position in a width direction of each the traveling lanes, a curvature of each the traveling lanes, a forward-movement azimuth angle of the traveling lane, a speed limit, and the like. The road data is held with attribute data such as data reliability and a data update date.

Furthermore, the locator unit 40 performs maintenance management on the map database DB and tests nodes, links and data points of the map database DB to constantly keep these in the latest state. Also, the locator unit 40 creates and adds new data concerning an area for which no data exists in the database, to construct a more detailed database. The data update of the map database DB and the new-data addition thereto are executed by matching the positioned location data and the data stored in the map database DB.

The braking/driving control unit 50 controls a traveling driving force generated by an electric motor and an internal combustion engine and also controls a traveling speed of the own vehicle, switching between forward and backward, braking, and the like. For example, the braking/driving control unit 50 controls an operation state of the engine based on various pieces of control information acquired via an in-vehicle network and signals from various sensors that detect the operation state of the engine. The braking/driving control unit 50 also controls a brake device (not illustrated) for four wheels based on vehicle information such as a brake switch, wheel speeds of the four wheels, a steering angle, and a yaw rate, independently of the brake operation of the occupant (driver). Furthermore, the braking/driving control unit 50 calculates brake fluid pressure of each wheel based on a brake force of each wheel to perform control of an anti-lock braking system and sideslip prevention, and the like.

The steering control unit 60 controls steering torque generated by an electric power steering (EPS) unit 61 provided in a steering system based, for example, on the vehicle speed, the driver's steering torque, the steering angle, the yaw rate, and other vehicle information. The control of the steering torque is performed as current control for an electric motor of the EPS unit 61 that achieves target steering torque intended to match an actual steering angle to a target steering angle. The EPS unit 61 regards target steering torque from the steering control unit 60 as instruction torque and controls a driving current of the electric motor which corresponds to the instruction torque by proportional integral differential (PID) control, for example.

The information notification unit 70 controls an output of an alarm in a case of occurrence of an abnormality in various devices of the vehicle or an alarm for attracting the driver's attention and an output of various pieces of information to be presented to the driver. For example, at least one of a visual output such as a monitor, a display, or an alarm lamp or an auditory output such as a speaker buzzer is used to notify the alarm and the control information. During the execution of the traveling control including the automatic driving, the information notification unit 70 presents the control state to the driver. When the traveling control including the automatic driving is paused by the driver's operation, the information notification unit 70 notifies the driving state at that time to the driver.

Next, a description will be given of the automatic driving control unit 20 that serves as the main component of the vehicle control system 10. When the driver operates a switch, a panel, or the like (not illustrated) to select a driving support mode for supporting the driver's driving or an automatic driving mode not requiring the driver's driving operation, with respect to a manual driving mode in which the driver performs all the driving operations, such as steering, acceleration/deceleration, and braking, to cause the own vehicle to travel, the automatic driving control unit 20 performs the traveling control via the braking/driving control unit 50 and the steering control unit 60 based on the information from the external environment recognition unit 30 and the locator unit 40.

In the present embodiment, the driving support mode means a driving mode for requiring the driver to hold the steering wheel or to steer and automatically performing at least one of acceleration/deceleration control or steering control, and the driving support mode includes partial automatic driving. On the other hand, the automatic driving mode means a driving mode for supposing hands-off driving in which the driver does not touch the steering wheel and is a conditional automatic driving mode for automatically performing all of the acceleration/deceleration control and the steering control in an operation region in design where an automatic driving function operates normally.

The automatic driving mode is canceled when, for example, the driver performs an override operation such as holding the steering wheel, steering at steering torque equal to or more than a set value, stepping on a brake pedal, or stepping on an accelerator pedal. Further, in the automatic driving mode, when the continuation of the operation by the system is difficult, the automatic driving is canceled, and the driving is left to the manual driving by the driver.

When the occupant (driver) turns on the automatic driving mode to input information of a destination and a transit point (facility name, address, telephone number, etc.) or directly specify the information on a map displayed on the panel or the like, the automatic driving control unit 20 sets position coordinates (latitude, longitude) of the traveling route via the locator unit 40, identifies the road to travel and the traveling lane, and determines a target route.

When a snowfall region is not included on the target route or there would be no problem in traveling even if there is snowfall on the target route, the automatic driving control unit 20 normally performs first automatic driving control along the target route by using a first automatic driving control system that is made redundant by a control system based on autonomous external environment recognition information obtained by the external environment recognition unit 30 and by a control system based on map information obtained by the locator unit 40 and self-location information. In the first automatic driving control system, even when one of the external environment recognition unit 30 or the locator unit 40 does not function properly, the automatic driving can be continued under limited conditions by the other unit.

On the other hand, when, on the target route, there is a snow-covered section due to snowfall and there is a section where traveling in the same manner as normal traveling is difficult despite the snow having been removed and the redundancy cannot be ensured in the first automatic driving control system, the automatic driving control unit 20 acquires traveling environment information of the section having the snow-removed area from the cloud CL and corrects the map information of the locator unit 40 by using the acquired traveling environment information. Then, the automatic driving control unit 20 performs second automatic driving control in the snow-removed area of the snow-covered section by using a second automatic driving control system formed by correcting the map information in the first automatic driving control system, that is, a second automatic driving control system which is made redundant by a control system based on autonomous external environment recognition information obtained by the external environment recognition unit 30, and by a control system based on the map information obtained by correcting the map information of the locator unit 40 and the self-location information.

The automatic driving control unit 20 includes a first automatic driving controller 21 and a second automatic driving controller 22 as functional units according to the first and second automatic driving control systems as described above. Further, the management and control system 200 includes a snow removal information collector 201 and a snow-removed area traveling environment information calculator 202 corresponding to the respective functional units of the automatic driving control unit 20.

The first automatic driving controller 21 performs the first automatic driving control in a section not covered with snow or a section covered with snow but not affecting the traveling. For example, the first automatic driving controller 21 calculates a central position in the width direction of the traveling lane of a road, identified via the locator unit 40, with the in-vehicle sensor such as a camera unit 31 and sets a trajectory in the forward-movement direction at the central position of the traveling lane as the target route for the automatic driving. This also applies to a case where the destination or the traveling route is not specified, and the trajectory in the forward-movement direction at the central position of the traveling lane is set as the target route for the automatic driving.

Further, the first automatic driving controller 21 sets a vehicle speed set by the driver or the speed limit of the road as a target vehicle speed for the automatic driving and causes the own vehicle to automatically travel to the destination along the target route while appropriately adjusting the target vehicle speed in accordance with a curvature of the target route, the type and gradient of the road, a distance from the other vehicle, and the like. When the destination or the traveling route is not specified, the own vehicle is caused to travel so as to follow the central position of the traveling lane.

Based on the information from the external environment recognition unit 30, the locator unit 40, and the in-vehicle sensors, the first automatic driving controller 21 detects the traveling state such as the location of the own vehicle in a lateral direction (lateral position) relative to the target route (the central position of the lane), a yaw angle relative to the target route in the forward-movement direction of the own vehicle, and the vehicle speed. Then, the automatic driving control unit 20 performs the steering control via the steering control unit 60 and the EPS unit 61 so that amounts of deviation in the lateral position and the yaw angle of the own vehicle relative to the target route converge within a pre-set control range, and the deviation amount of the speed of the own vehicle relative to the target speed converges within a pre-set control range. Also, the automatic driving control unit 20 performs the acceleration/deceleration control towards the target speed via the braking/driving control unit 50.

When there is a snow-covered section on the target route for the automatic driving and the own vehicle travels in a snow-removed area, if ensuring the redundancy is difficult in the first automatic driving control, the second automatic driving controller 22 performs the second automatic driving control, to thereby enable traveling by the automatic driving while ensuring the redundancy. For example, the second automatic driving controller 22 corrects the map information of the map database held in the own vehicle based on the traveling environment information of the snow-removed area, received from the management and control system 200 via the cloud, and performs the second automatic driving control in which the target route in the first automatic driving control is reconfigured.

Here, a description will be given of the collection of snow removal information of the snow-covered section and the calculation of the traveling environment information of snow-removed area performed by the management and control system 200. The snow removal information of the snow-covered section is collected by the snow removal information collector 201 of the management and control system 200, and the traveling environment information of the snow-removed area in the snow-covered section is calculated by the snow-removed area traveling environment information calculator 202.

Figure 2:
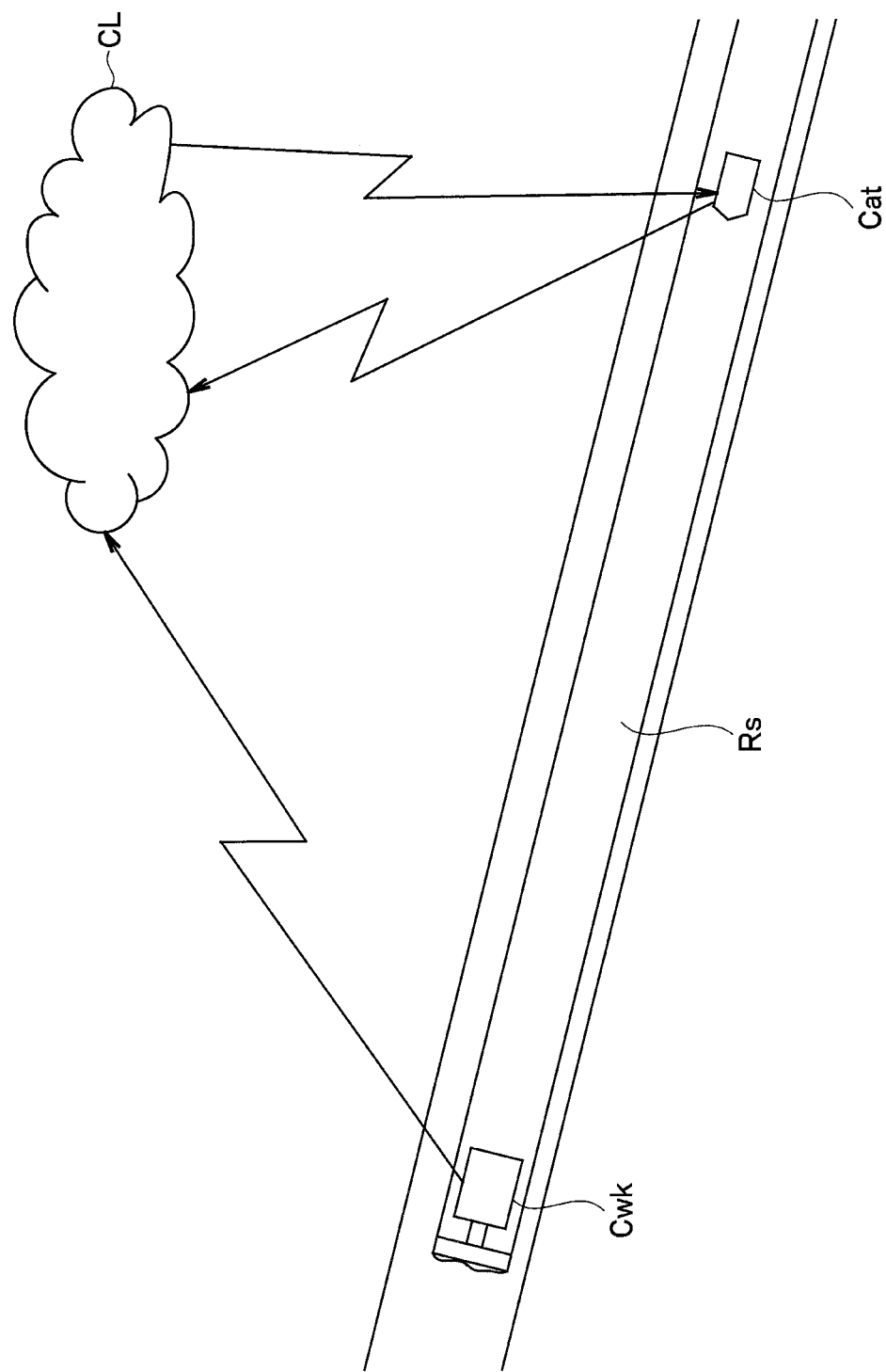
FIG. 2 is an explanatory view illustrating transmission and reception of information of a snow-covered section.

The snow removal information collector 201 collects the snow removal information on the snow-removed area of the snow-covered section from a plurality of vehicles via the cloud CL. As illustrated in FIG. 2, the snow removal information is collected via the cloud CL from at least one of a snow removal vehicle Cwk having performed the snow removal work or an automatic driving vehicle Cat having traveled in the snow-removed area. FIG. 2 is an explanatory view illustrating transmission and reception of information of the snow-covered section.

The controlling system 100 for controlling the snow removal work in the snow-covered section is mounted in the snow removal vehicle Cwk, and from the snow removal work information transmitter 101 of the controlling system 100, snow removal work information is transmitted to and uploaded onto the cloud CL, the snow removal work information including the location information (section information of a start point and an end point) of the snow-removed area where the snow removal work has been completed in the snow-covered section, a width of a snow-removed area Rs (a width in the vehicle width direction), and snow removal start and end times. Further, in a case where the automatic driving vehicle Cat travels in the snow-removed area Rs of the snow-covered section, a shape and a height of each of right and left snow walls of the snow-removed area, a height of the road surface, a width of a travelable area, passage information including a passage speed and a passage time are transmitted to and uploaded onto the cloud CL.

From the collected snow removal information, the snow removal information collector 201 removes old data and data deviating from an average value, extracts highly reliable data, and transmits the extracted data to the snow-removed area traveling environment information calculator 202. Based on the snow removal information from the snow removal information collector 201, the snow-removed area traveling environment information calculator 202 calculates the traveling environment information to be reference information at the time of traveling in the snow-removed area.

The snow-removed area traveling environment information calculator 202 calculates various pieces of information that change with the passage of time after snow removal, such as data of changes in the width and length of the travelable area due to changes in the shapes of the right and left snow walls, and a change in the height of the road surface. Along with the above data, the snow-removed area traveling environment information calculator 202 delivers, via the cloud, the traveling environment information including time information such as the elapsed time after snow removal and a time of data calculation and position information of the snow-removed area.

The traveling environment information delivered from the snow-removed area traveling environment information calculator 202 is received by the vehicle control system 10 via the cloud. In the second automatic driving controller 22 of the automatic driving control unit 20, the vehicle control system 10 corrects the dynamic map of the map database DB based on the traveling environment information of the snow-removed area and reconfigures the target route for the automatic driving based on the corrected map information. The second automatic driving controller 22 performs the second automatic driving control based on the location information via the locator unit 40 and the external environment recognition information via the external environment recognition unit 30 so as to follow a new target route based on the corrected map information.

Figure 3:
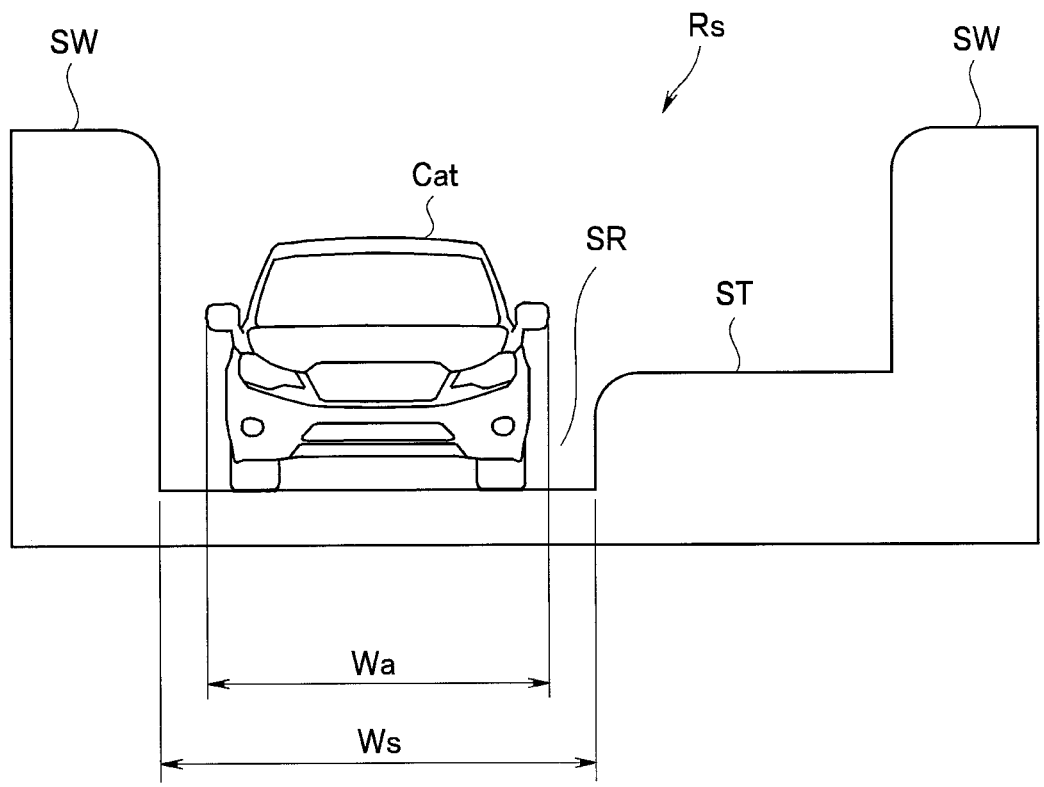
FIG. 3 is an explanatory view illustrating a snow-removed area.

The target route for the automatic driving in the snow-removed area is reconfigured, for example, in accordance with a width of a travelable area SR in the snow-removed area Rs, as illustrated in FIG. 3. FIG. 3 is an explanatory view illustrating a snow-removed area, and from the received traveling environment information, data such as shapes, heights, and widths are acquired concerning right and left snow walls SW of a road, a non-travelable area ST, the travelable area SR, and the like.

The second automatic driving controller 22 sets the target route in the snow-removed area in accordance with a magnitude relation between a width Ws of the travelable area SR and a vehicle width Wa of the own vehicle Cat. In the present embodiment, the second automatic driving controller 22 regards a value of twice the vehicle width Wa of the own vehicle Cat as a threshold H (H=2×Wa), examines whether the width Ws of the travelable area SR is a threshold H or more, and reconfigures the target route as shown in (1) and (2) below in accordance with the magnitude relation between Ws and H, to perform the automatic driving.

(1) When Ws<H

The second automatic driving controller 22 reconfigures the central position in the width direction of the travelable area SR (position at a half of the width Ws) as the target route for automatic driving and performs the second automatic driving control so as to follow the reconfigured target route.

However, when Ws<H and a preceding vehicle is recognized just before the own vehicle enters the travelable area or while the own vehicle is traveling in the traveling area, the second automatic driving controller 22 suspends the second automatic driving control and switches to preceding-vehicle following control to follow a traveling trajectory of the preceding vehicle.

When Ws<H and an oncoming vehicle is recognized in the travelable area, the second automatic driving controller 22 searches for a point at which the own vehicle and the oncoming vehicle can pass each other based on the map data obtained by the locator unit 40 or the external environment recognition information obtained by the camera unit 31 of the external environment recognition unit 30.

For example, the second automatic driving controller 22 searches for a wide portion in the snow-removed area, a retreat area before the entry into the snow-removed area, or the like and then suspends the second automatic driving control while presenting the found point to the occupant, to request the occupant to take over the driving. Thereby, the own vehicle is stopped at the point where the own vehicle and the oncoming vehicle can pass each other and is waited until the oncoming vehicle passes.

(2) When Ws≥H

The second automatic driving controller 22 reconfigures a position at a quarter from the side end of the travelable area SR, which is relatively the nearer side from the own vehicle, as the target route for the automatic driving and performs the second automatic driving control so as to follow the reconfigured target route.

Figure 4:
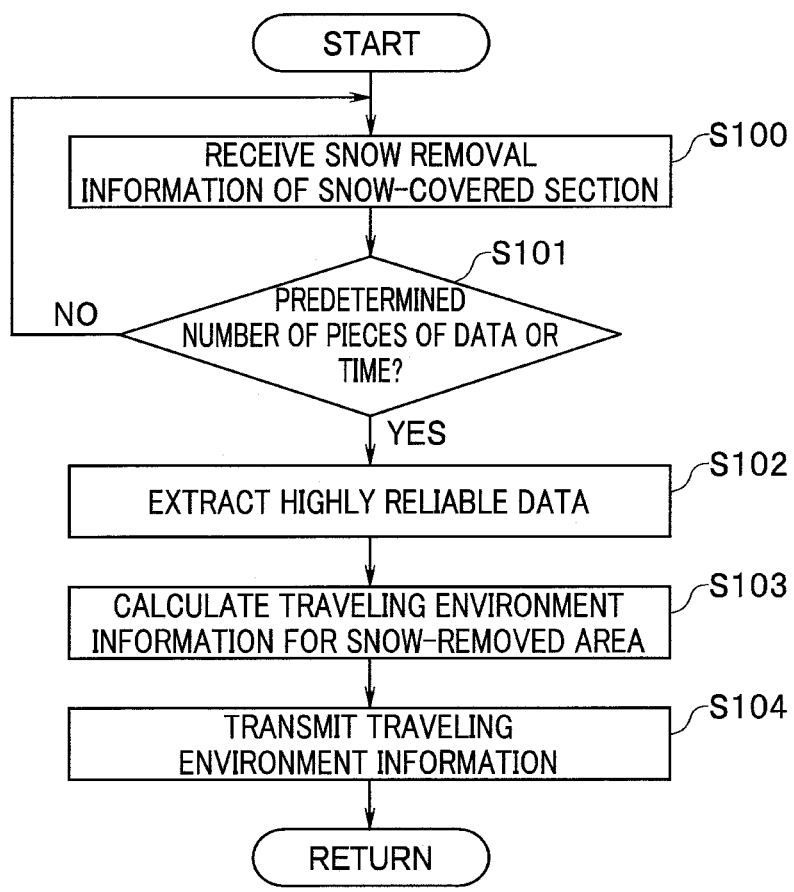
FIG. 4 is a flowchart illustrating processing on a side of a management and control system.
Figure 5:
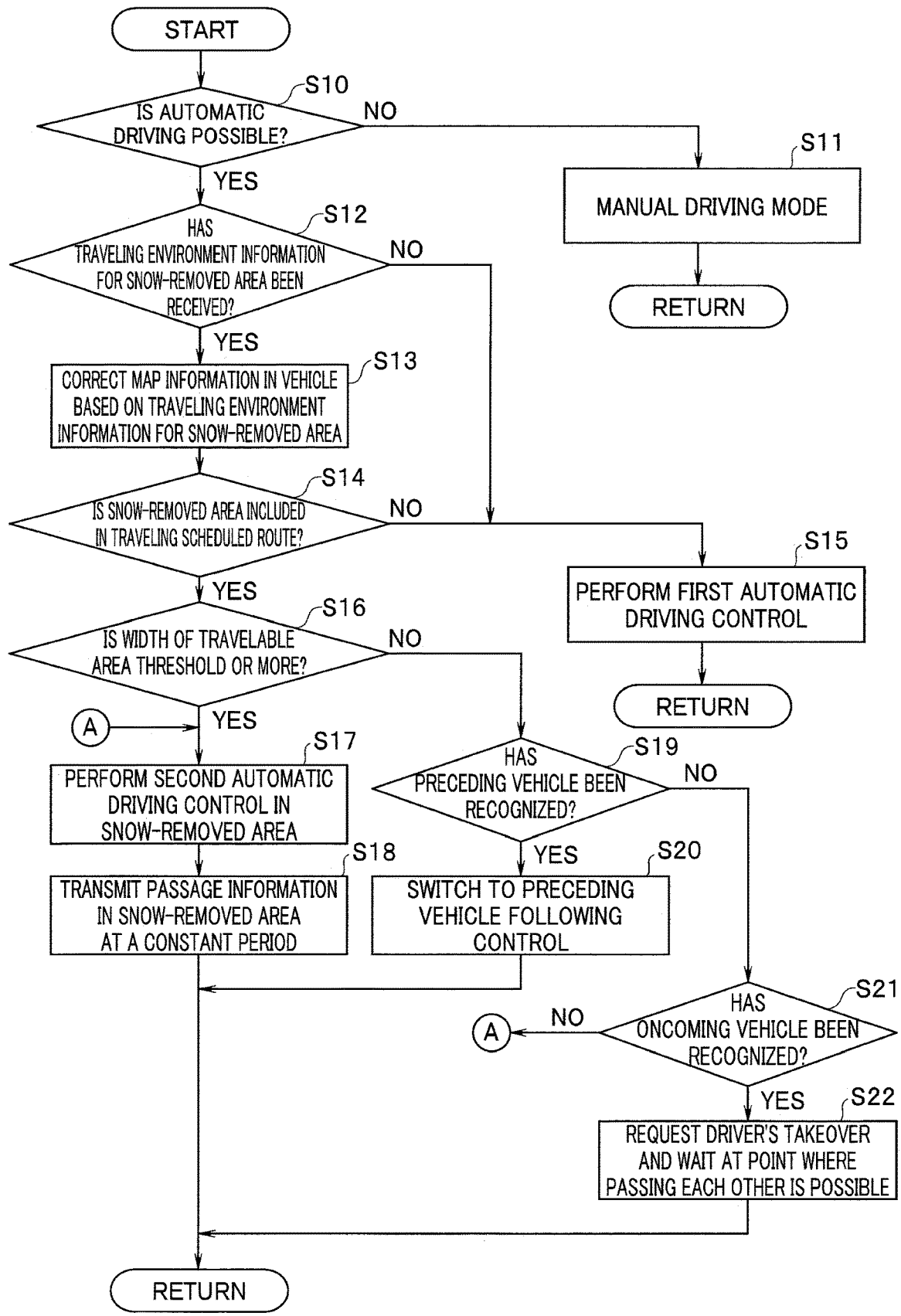
FIG. 5 is a flowchart illustrating processing on a side of a vehicle control system.

Next, an operation of the traffic control system 1 will be described using the flowcharts of FIGS. 4 and 5. FIG. 4 is a flowchart that illustrates processing on a side of the management and control system, and FIG. 5 is a flowchart that illustrates processing on a side of the vehicle control system.

First, the processing on the side of the management and control system in FIG. 4 will be described. In step S100, the management and control system 200 receives the snow removal information of the snow-covered section via the cloud as the processing performed by the snow removal information collector 201. In step S101, the management and control system 200 examines whether the snow removal information has been received in a predetermined number of pieces of data or for a predetermined time. When the snow removal information has not been collected in the predetermined number of pieces of data or for the predetermined period of time, the collection of the snow removal information is continued in step S100. When the snow removal information has been collected in the predetermined number of pieces of data or for the predetermined time, the processing proceeds to step S102.

In step S102, from the collected snow removal information, the management and control system 200 deletes data as old as or older than a set time and data deviating from average data and extracts highly reliable data. Subsequent step S103 is processing in the snow-removed area traveling environment information calculator 202 of the management and control system 200, and based on the snow removal information of the snow-covered section, the traveling environment information, including the width and length of the travelable area in the snow-removed area and the position and time, is calculated.

Thereafter, the processing proceeds to step S104, and the snow-removed area traveling environment information calculator 202 delivers the traveling environment information calculated in step S103 to the automatic traveling vehicle via the cloud. In this case, when the automatic driving vehicle moving forward to the snow-covered section can be detected using the location information transmitted from road incidental equipment and the vehicle, the traveling environment information is transmitted to the automatic driving vehicle located within a set range before the snow-covered section. On the other hand, when it is not possible to detect the current location of each of individual automatic driving vehicles on the side of the management and control system 200, it is determined whether to employ the traveling environment information based on the position information of the snow-removed area in the snow-covered section or some other information included in the traveling environment information received from the cloud on the vehicle side.

Further, in the calculation of the snow-removed area in the snow-covered section, a correction may be made based on weather information including snowfall information obtained by the automated meteorological data acquisition system (AMeDAS).

Next, the processing on the side of the vehicle control system in FIG. 5 will be described. In the automatic driving control unit 20, the vehicle control system 10 determines whether the automatic driving is possible in first step S10. For example, when an abnormality occurs in a part of the system, or when the own vehicle is out of the operation region for the automatic driving by entering a snow-covered section with the snow unremoved, the automatic driving control unit 20 determines that the continuation of the automatic driving is impossible. Then, the processing proceeds from step S10 to step S11, and the automatic driving control unit 20 requests the occupant to take over the driving and shifts the driving mode from the automatic driving mode to the manual driving mode.

On the other hand, when the automatic driving is possible in step S10, the processing proceeds from step S10 to step S12, and the automatic driving control unit 20 examines whether the traveling environment information of the snow-removed area in the snow-covered section has been received. Then, when the traveling environment information of the snow-removed area has not been received, that is, when there is no snow-covered section on the route where the own vehicle moves forward, the processing proceeds from step S12 to step S15, and the automatic driving control unit 20 performs the first automatic driving control to cause the own vehicle to travel along the target route.

On the other hand, when the traveling environment information of the snow-removed area in the snow-covered section has been received in step S12, the processing proceeds from step S12 to step S13, and the automatic driving control unit 20 corrects the map information of the map database DB held in the own vehicle based on the received traveling environment information, as the processing of the second automatic driving controller 22. Then, in step S14, the second automatic driving controller 22 examines whether the snow-removed area based on the received traveling environment information is included in a traveling scheduled route for the own vehicle.

As a result, when there is no information corresponding to the traveling scheduled route for the own vehicle in the received traveling environment information of the snow-removed area and the traveling scheduled route for the own vehicle does not include the snow-removed area based on the received traveling environment information, the processing proceeds from step S14 to step S15 to shift to the processing of the first automatic driving controller 21, and the first automatic driving control is performed. In this case, the traveling scheduled route for the own vehicle does not include the corrected portion of the map, and the same control as the control for a normal non-snow-covered section is performed.

On the other hand, when there is information corresponding to the traveling scheduled route for the own vehicle in the received traveling environment information of the snow-removed area and the traveling scheduled route for the own vehicle includes the snow-removed area, the processing proceeds from step S14 to step S16, and the second automatic driving controller 22 examines whether the width Ws of the travelable area is the threshold H or more.

When Ws≥H in step S16, the processing proceeds from step S16 to step S17, and the second automatic driving controller 22 reconfigures the target route for the automatic driving in a predetermined position of the travelable area (for example, a position at a quarter from the side end of the travelable area, which is relatively the nearer side from the own vehicle, as described above) and performs the second automatic driving control in the snow-removed area. Then, in step S18, the second automatic driving controller 22 transmits the passage information during the traveling in the snow-removed area to the cloud at a constant period.

On the other hand, when Ws<H in step S16, the processing proceeds from step S16 to step S19, and the second automatic driving controller 22 examines whether a preceding vehicle has been recognized ahead of the own vehicle. When a preceding vehicle has been recognized, the processing proceeds from step S19 to step S20, and the second automatic driving controller 22 switches from the second automatic driving control to the preceding-vehicle following control to follow the traveling trajectory of the preceding vehicle. When a preceding vehicle has not been recognized, the processing proceeds from step S19 to step S21.

In step S21, the second automatic driving controller 22 examines whether an oncoming vehicle traveling in the travelable area has been recognized. When an oncoming vehicle has not been recognized, the processing returns from step S21 to step S17, and the second automatic driving controller 22 performs the second automatic driving control. In the second automatic driving control in this case, the central position in the width direction of the travelable area (a position at a half of the width Ws) is reconfigured as the target route for the automatic driving.

On the other hand, in step S21, when an oncoming vehicle traveling in the travelable area has been recognized, the processing proceeds from step S21 to step S22, and the second automatic driving controller 22 stops the automatic driving and outputs a driver takeover request for requesting the occupant of the vehicle to take over the driving. The second automatic driving controller 22 also searches for a point at which the own vehicle and the oncoming vehicle can pass each other via the locator unit 40 or the external environment recognition unit 30 and presents the searched point to the driver, so that the own vehicle is stopped at the point where the own vehicle and the oncoming vehicle can pass each other and is waited until the oncoming vehicle passes.

As thus described, in the present embodiment, the management and control system 200 collects the snow removal information on the snow-removed area of the snow-covered section and delivers the traveling environment information based on the collected snow-removed information to the automatic driving vehicle passing through the snow-removed area.

The automatic driving vehicle includes: the first automatic driving control system that is made redundant by a control system for the automatic driving based on map information held in an own vehicle and location information of the own vehicle, and by a control system for the automatic driving based on external environment recognition information obtained by autonomously recognizing an external environment of the own vehicle; and the second automatic driving control system that is made redundant by a control system for the automatic driving based on the map information corrected using the traveling environment information of the snow-removed area and the location information of the own vehicle, and by a control system for the automatic driving based on the external environment recognition information of autonomously recognizing the external environment of the own vehicle.

Thus, when the redundancy cannot be ensured by the first automatic driving control at the time of traveling in the snow-removed area, the automatic driving control by the second automatic driving control system is performed. Thereby, the own vehicle can pass through the snow-removed area while the redundancy of the automatic driving control is ensured even on a road covered with snow, and safe and smooth traffic flow can be achieved.

Each of the vehicle control system 10 and the management and control system 200 of the traffic control system 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the management and control system 200 including the snow removal information collector 201 and the snow-removed area traveling environment information calculator 202 and the vehicle control system 10 including the first automatic driving controller 21 and the second automatic driving controller 22 (see FIG. 1). Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 1.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A traffic control system comprising:
a vehicle control system configured to control an automatic driving vehicle to travel along a target traveling route under automatic travel control; and
a management and control system configured to:
collect snow removal information on a snow-removed area of a snow-covered section of a road from at least one of a snow removal vehicle that performs snow removal work in the snow-covered section or the automatic driving vehicle that travels in the snow-removed area of the snow-covered section;
calculate traveling environment information of the snow-removed area in the snow-covered section based on the collected snow removal information; and
transmit the calculated traveling environment information to the vehicle control system of the automatic driving vehicle,
wherein the vehicle control system is configured to:
in response to receiving the calculated traveling environment information, 1) correct map information stored in the automatic driving vehicle using the calculated traveling environment information for the snow-removed area and 2) determine whether the target traveling route of the automatic driving vehicle runs through the snow-removed area indicated in the calculated traveling environment information based on the corrected the map information;
when the target traveling route of the automatic driving vehicle does not run through the snow-removed area indicated in the calculated traveling environment information, perform first automatic driving control based on i) the corrected map information, ii) location information of the automatic driving vehicle, and iii) external environment recognition information of an external environment of the automatic driving vehicle; and
when 1) the target traveling route of the automatic driving vehicle runs through the snow-removed area indicated in the calculated traveling environment information and 2) the automatic driving vehicle is determined to be able to travel through the snow-removed area based on determining that a width of a travelable area of the snow-removed area included in the collected snow removal information is greater than a width of the automatic driving vehicle, perform second automatic driving control based on i) the location information of the automatic driving vehicle, ii) the corrected map information, and iii) the external environment recognition information of the external environment of the automatic driving vehicle, and
wherein, when the vehicle control system performs the second automatic driving in response to determining that the width of the travelable area is greater than the width of the automatic driving vehicle, the vehicle system is configured to:
determine whether the width of the travelable area of the snow-removed area is less than a threshold width, the threshold width is twice the width of the automatic driving vehicle;
in response to determining that the width of the travelable area of the snow-removed area is not less than the threshold width, set the target traveling route on a position at a quarter of a width of the travelable area from one of two sides of the travelable area closer to the automatic driving vehicle;

in response to determining that the width of the travelable area of the snow-removed area is less than the threshold width, i) set the target traveling route on a central position of the travelable area in a width direction of the travelable area and ii) determine whether an oncoming vehicle is recognized as passing through the travelable area towards the automatic driving vehicle; and in response to a determination that the oncoming vehicle is recognized, i) search for a retreat area along the road, ii) suspend the second automatic driving control, and iii) request an occupant of the automatic driving vehicle to take over driving and move the automatic driving vehicle to the retreat area to allow the oncoming vehicle to pass.

2. The traffic control system for the automatic driving vehicle according to claim 1, wherein in a case where the vehicle control system performs the second automatic driving, when the vehicle control system determines that the width of the travelable area in the snow-removed area is smaller than the threshold width, the vehicle control system sets the target traveling route for the second automatic driving control in accordance with a magnitude relation between the width of the travelable area and the threshold width.

3. The traffic control system according to claim 1, wherein the collected snow removal information includes information of a shape and a height of each of left and right snow walls of respective sides of the travelable area of the snow-removed area.

4. A traffic control system for an automatic driving vehicle, the system comprising:

first circuitry configured to control the automatic driving vehicle to travel along a target traveling route under automatic travel control; and second circuitry configured to:
collect snow removal information on a snow-removed area of a snow-covered section from at least one of a snow removal vehicle that performs snow removal work in the snow-covered section of a road or the automatic driving vehicle that travels in the snow-removed area of the snow-covered section;

calculate traveling environment information of the snow-removed area in the snow-covered section based on the collected snow removal information;

transmit the calculated traveling environment information to the first circuitry, wherein the first circuitry is configured to:
when the target traveling route of the automatic driving vehicle does not run through the snow-removed area indicated in the calculated traveling environment information, perform first automatic driving control based on i) map information held in the automatic driving vehicle, ii) location information of the automatic driving vehicle, and iii) external environment recognition information of an external environment of the automatic driving vehicle; and when the target traveling route of the automatic driving vehicle runs through the snow-removed area indicated in the calculated traveling environment information and when the automatic driving vehicle is determined to be able to travel through the snow-removed area based on determining that a width of a travelable area of the snow-removed area included in the collected snow removal information is greater than a width of the automatic driving vehicle, perform second automatic driving control based on i) the location information of the automatic driving vehicle, ii) the map information, and iii) the external environment recognition information of the external environment of the automatic driving vehicle, and wherein when the second circuitry determines that 1) the width of the travelable area of the snow-removed area is greater than the width of the automatic driving vehicle but less than twice the width of the automatic driving vehicle and 2) an oncoming vehicle is recognized as passing through the travelable area towards the automatic driving vehicle, the second circuitry i) searches for a retreat area along the road prior to the automatic vehicle entering the travelable area, ii) suspends the second automatic driving control, and iii) requests an occupant of the automatic driving vehicle to take over driving and move the automatic driving vehicle to the retreat area to allow the oncoming vehicle to pass.

* * * * *